INVENTOR.
RICHARD W. HAUTZENROEDER
BY Tweedale & Gerhardt
ATTORNEYS.

INVENTOR
RICHARD W. HAUTZENROEDER
BY
Tweedale & Gerhardt
ATTORNEYS.

Aug. 22, 1967  R. W. HAUTZENROEDER  3,336,996
COMBINED DRAFT AND POWER TRANSMISSION COUPLING
Filed Jan. 21, 1965  3 Sheets-Sheet 3
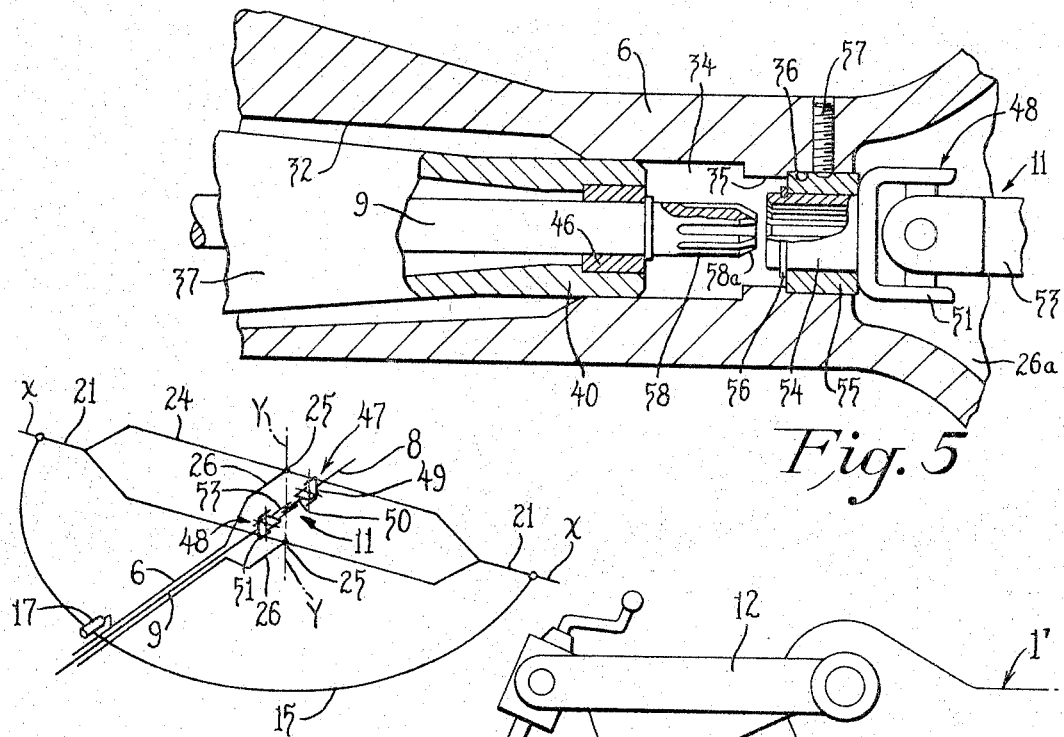
Fig. 5
Fig. 6
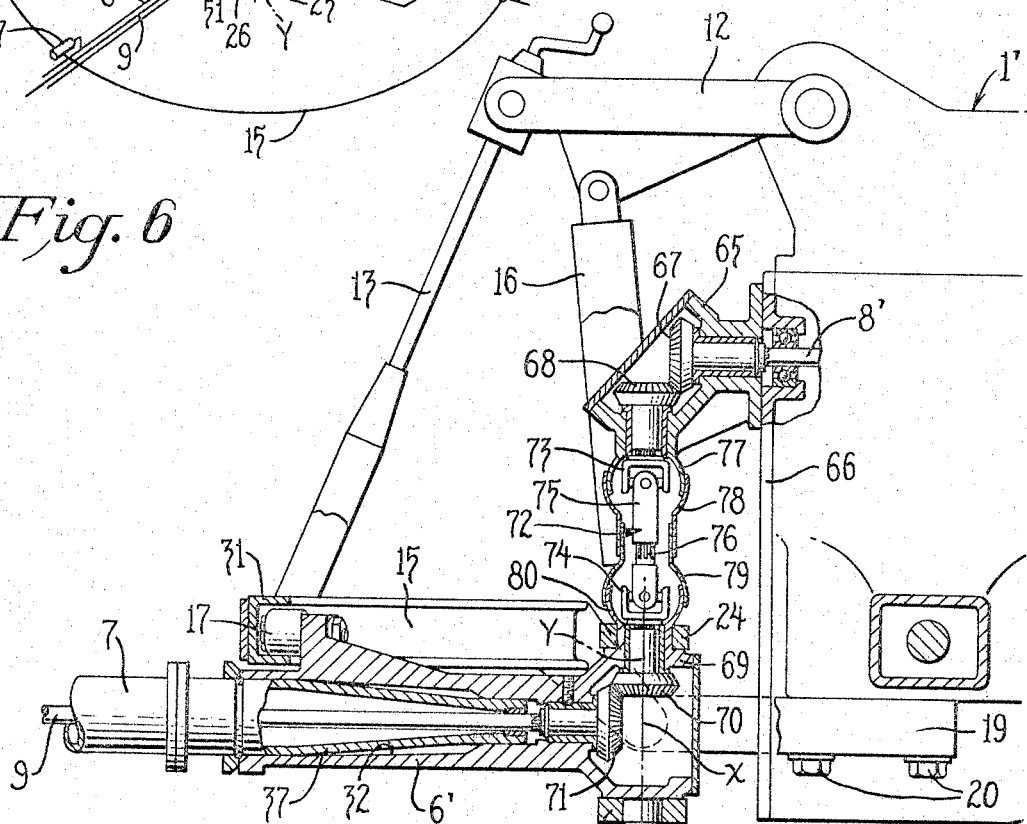
Fig. 7
INVENTOR
RICHARD W. HAUTZENROEDER
BY
Tweedale & Gerhardt
ATTORNEYS.

United States Patent Office 3,336,996
Patented Aug. 22, 1967

3,336,996
COMBINED DRAFT AND POWER TRANSMISSION COUPLING
Richard W. Hautzenroeder, Detroit, Mich., assignor to Massey-Ferguson Inc., Detroit, Mich.
Filed Jan. 21, 1965, Ser. No. 427,017
6 Claims. (Cl. 180—14)

This invention relates generally to hitch mechanisms for coupling tractors and trailers together, and is particularly concerned with hitch mechanisms for connecting agricultural implements to tractors and transmitting power to the implement from the power-take-off shaft of the tractor.

As farm mechanization has increased in recent years, more and more agricultural implements have come into use of the type which receive power for operating their various components parts from the power-take-off shaft of the propelling vehicle or tractor. Conventionally, the implement tongue is connected to the drawbar of the tractor by means of a clevis and pin hitch. The power-take-off shaft of the tractor is connected to the drive shaft of the implement usually by means of two or more universal joints connected to each other by male and female telescoping, splined shafts. In some cases, instead of telescoping coupling shafts, the implement drive shaft is constructed to telescope necessitating the inclusion of a third universal joint. The vertical, horizontal and longitudinal relationship of the tractor power-take-off shaft and the drawbar hitch pin hole is standardized, but the implement drive shaft is not standardized either dimensionally or relatively to the hitch pin holes in the implement tongue.

Nearly all countries and states require that the rotating joints and shafts be shielded. However, in order to connect the implement to the tractor, the shields must be removed, and the operator frequently neglects to replace the shield after the implement has been coupled to the tractor. The rotating joints and shafts are extremely hazardous when not shielded, and severe injuries have frequently occurred as a result. Moreover, the telescoping shafts do not slide or telescope readily while transmitting power and impose excessive thrust loads on the power-take-off shaft bearings when the tractor and implement articulate with respect to each other when crossing rises, depressions or during turns. The high thrust loads encountered during turning are translated to bending loads on the tractor power-take-off shaft which is extremely undesirable.

On the larger and more powerful tractors, larger universal joints are required, and sufficient telescoping length cannot be obtained between the two joints to maintain equal joint angles when turning. Thus, unequal distances from the pivotal hitch pin must be used and the resulting unequal joint angles introduce cyclic variations in the angular velocity at the driven implement resulting in high stresses and limited endurance. Frequently, the telescoping shaft and its shield foul the drawbar hitch pin and clevis and damage parts when the tractor and trailing implement pass over sharp rises or banks. The telescoping shafts have been known to separate during such maneuver creating a hazardous flail out of the coupling part attached to the driven power-take-off shaft of the tractor.

Moreover, the power-take-off drive components are heavy on large tractors and are difficult for one man to handle. Furthermore, the standard clevis and pin type of hitch does not provide sufficient articulation in the vertical plane and can be broken when traversing a sharp rise or depression with hazardous separation of the implement while in motion.

In accordance with the present invention, the rotating shafts and universal joints are permanently shielded whether an implement is attached or not to the tractor. The power-take-off shaft and universal couplings are permanently shielded by the drawbar which is preferably of tubular construction having an internal cylindrical recess therein for receiving the drive shaft of the implement.

The implement draft tongue is preferably hollow with the drive shaft supported within the hollow tongue. When the tongue is attached to the drawbar, the implement drive shaft mates with the universal coupling within the drawbar.

For connecting the drive shaft of the implement with the power-take-off shaft of the tractor, a telescoping, universal drive coupling has one end secured to the power-take-off shaft and its other end rotatably mounted within the drawbar recess. Preferably, the implement tongue is of conical configuration at its outer end as disclosed in the copending U.S. patent application of E. V. Bunting, S.N. 302,132, filed Aug. 14, 1963, now Patent Number 3,241,862 and E. V. Bunting, H. Rahman and D. J. Kiesgen, S.N. 359,076, filed April 13, 1964, to provide for greater ease in inserting the end of the tongue into the cylindrical recess of the drawbar. The implement drive shaft is rotatably journalled in the outer end of the implement tongue and projects outwardly therefrom. When the tongue is inserted into the recess of the drawbar, the implement drive shaft comes into alignment with the drawbar portion of the universal drive coupling. The drawbar portion of the drive coupling and the outer end of the implement drive shaft are provided with mating splined portions such that the drive shaft automatically engages the coupling when the tongue is in position in the drawbar.

As disclosed in the above referred to copending applications, the conical portion of the implement tongue is preferably supported within the drawbar only at its ends in such a manner that vertical or lifting forces on the drawbar are distributed between the ends of the conical section. The implement tongue may be mounted for rotation with respect to the drawbar about its longitudinal axis to accommodate tilting or rolling action of the implement with respect to the tractor.

The invention may further include an arcuate frame mounted on the rear of the tractor for pivotal movement about a transverse horizontal axis. For controlling the pivotal movement of the frame, the tractor power lift arms are pivotally connected with the arcute frame, and the drawbar carries a follower which rides in the arcuate track defined by the frame member such that the frame member and drawbar pivot as a unit about the aforementioned transverse horizontal axis. Consequently, the drawbar is vertically pivotal about the transverse horizontal axis and is capable of lateral swinging movement about an axis perpendicular to, and rotatable about, the transverse horizontal axis.

Other objects, advantages and features of the invention will become apparent from the following description taken in connection with the accompanying drawings in which:

FIG. 5 is an enlarged detail view of the mating portions of the drawbar and implement tongue, as well as the drive coupling and implement drive shaft;

FIG. 6 is a schematic perspective view of the hitch arrangement of FIGS. 2–4; and FIG. 7 is a fragmentary elevational view, partially in section, of an alternate embodiment of the invention.

While specific forms of the invention are illustrated and described in the foregoing specification, it should be understood that the invention is not limited to the exact construction shown. On the contrary, the invention includes various equivalents alternatives, modifications and alterations in the construction and arangement of parts, all falling within the scope and spirit of the invention.

Figure 1:
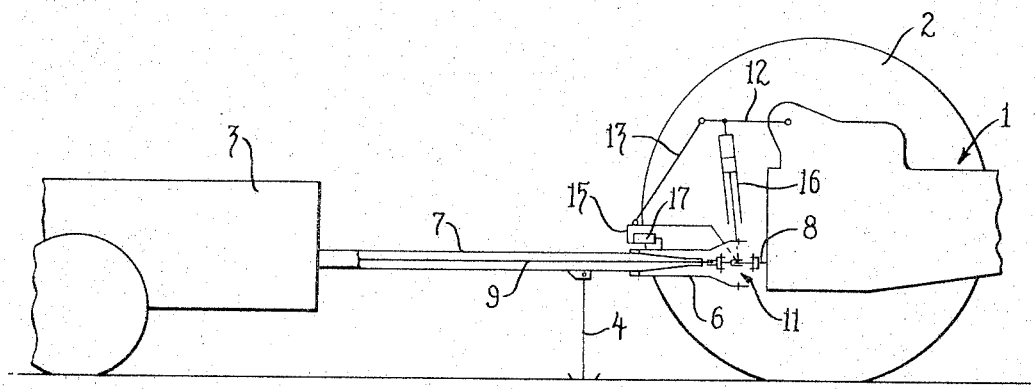
FIG. 1 is a schematic elevational view of a tractor having an implement coupled thereto in accordance with the invention.

In FIG. 1, the rear end of a tractor 1 is supported on rear wheels 2 and is coupled to a trailer or implement 3 provided with a forwardly extending hollow tongue member 7 coupled to a drawbar 6 mounted on the rear of the tractor 1. Projecting rearwardly from the chassis of the tractor is a power-take-off shaft 8 which is coupled to the implement drive shaft 9 by means of a telescopic, universal coupling 11 to transmit power from the power-take-off shaft to the operating components of the implement through coupling 11 and drive shaft 9.

Pivotally mounted on the rear of tractor 1 is a pair of conventional lift links 12 connected by means of drop links 13 with an arcuate frame member 15. The arcuate frame member 15 is mounted on tractor 1 for vertical pivotal movement about a transverse horizontal axis X—X (FIG. 6). Lift links 12 are actuated by a pair of hydraulic cylinders 16 which are controlled by the operator through the tractor hydraulic system in a well-known manner. Drawbar 6 carries one or more follower rollers 17 which are engaged with frame member 15 so that the drawbar and frame member pivot in a vertical plane as a unit.

Figure 2:
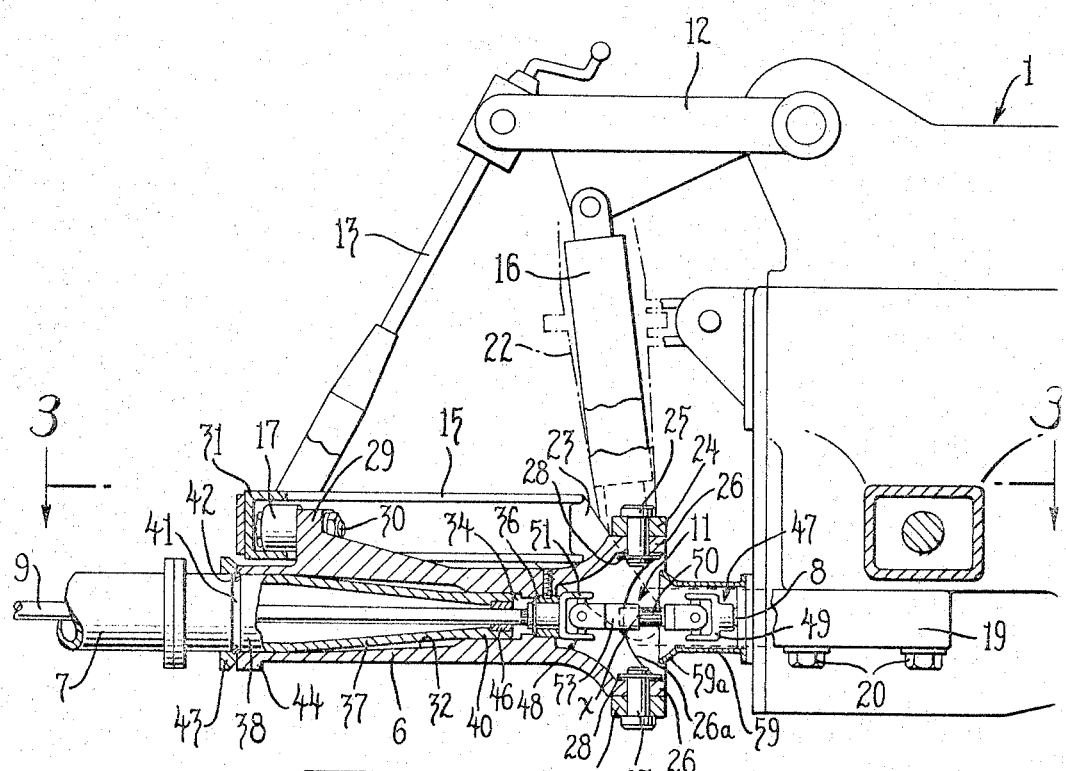
FIG. 2 is an elevational view, partially in section, of a hitch arrangement embodying the invention.
Figure 3:
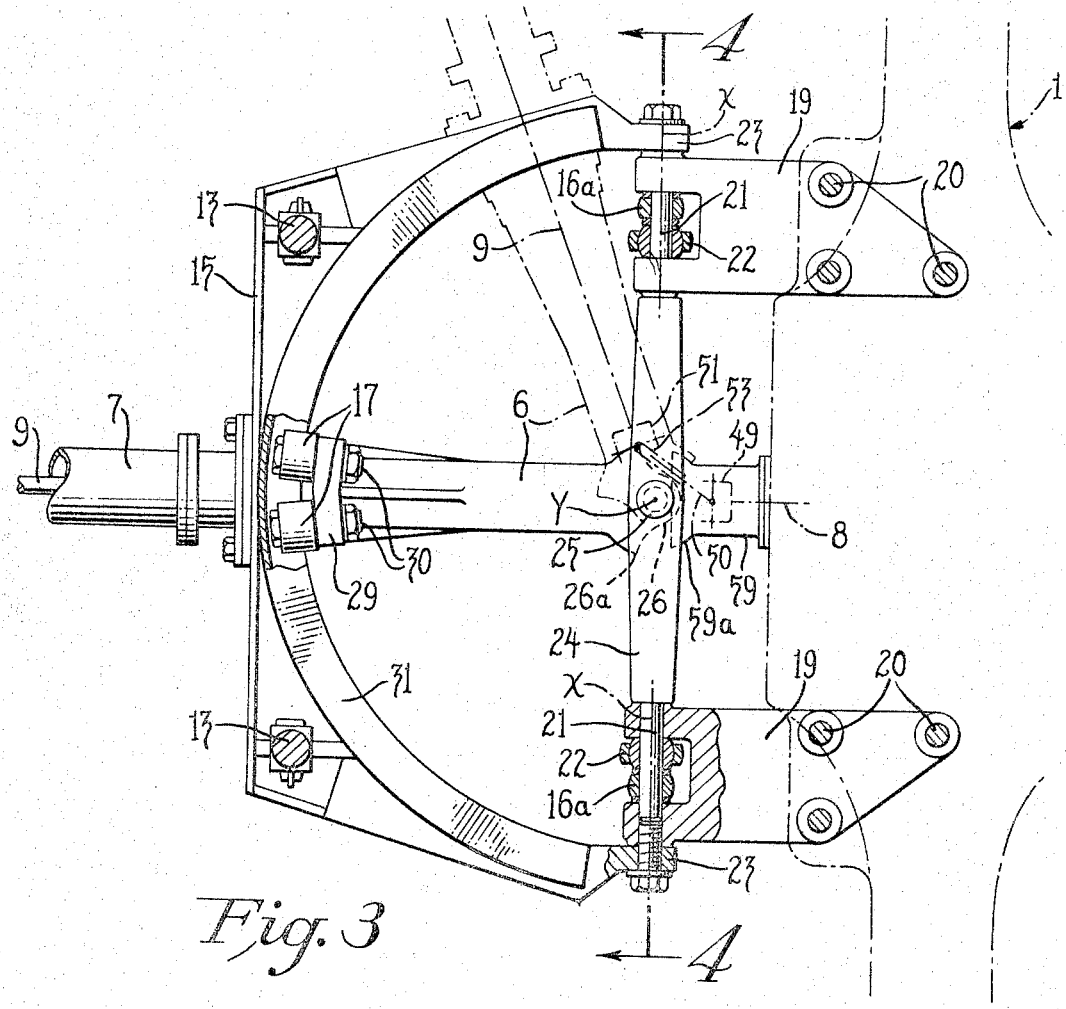
FIG. 3 is a plan view of the hitch arrangement of FIG. 2.

With reference to FIGS. 2 and 3, frame member 15 is pivotally mounted on the outer ends of a pair of coaxial rods 21 rotatably mounted in the rearwardly projecting, bifurcated ends of a pair of support members 19 secured to the chassis of the tractor by bolts 20. Frame member 15 is formed with forwardly projecting arms 23 which are rotatably mounted on the outer ends of rods 21, and the horizontal transverse axis X—X of FIG. 6 corresponds to the longitudinal axes of rods 21. Rods 21 support the lower end 16a of the hydraulic cylinder assembly 16 as well as the ends of the tractor lower links 22 which are moved to their stored position for installation of the present hitch mechanism. Lower links 22 may be stored in the manner shown in the copending U.S. patent application Ser. No. 302,132 referred to above.

Figure 4:
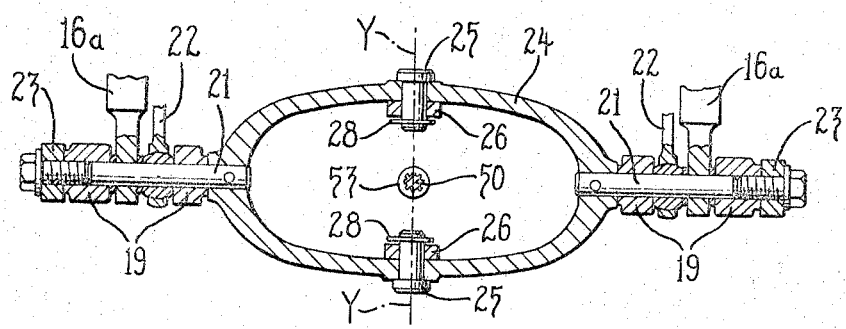
FIG. 4 is a sectional view taken on line 4—4 of FIG. 3.

Mounted on the opposed, inner ends of rods 21 is a collar member 24 (FIG. 4), and a pair of oppositely disposed lugs or ears 26 formed on the forward end of drawbar 6 extend between the upper and lower portions of collar 24 and are pivotally secured thereto by pivot pins 25. Thus, the drawbar is swingably mounted on collar 24 for lateral movement about an axis Y—Y (FIGS. 4 and 6) common to the axes of pins 25. Furthermore, axis Y—Y is perpendicular to the axis of rod 21 and is rotatable about axis X—X upon pivotal movement of frame member 15 about axis X—X. Pins 25 are secured against accidental removal by retaining pins 28 as shown in FIGS. 2 and 4.

The follower rollers 17 are rotatably supported on stub axles, bolts or pins 30 mounted in a bracket 29 formed integrally with drawbar 6. Rollers 17 are engaged with an arcuate track 31 on frame member 15 which is defined by a curved channel member. Thus, frame member 15 and drawbar 6 pivot vertically as a unit about axis X—X, and the drawbar can swing laterally about axis Y—Y in any position of the frame and drawbar with respect to the tractor.

Drawbar 6 is formed with a longitudinal socket 32, the intermediate portion of which is of non-uniform cross section which merges with a cylindrical pilot opening 34 for receiving the end of the implement tongue in a manner to be set forth presently. Pilot opening 34 is separated from a cylindrical bearing support 36 by an inwardly projecting annular stop 35 (FIGS. 2 and 5).

The implement tongue 7 is provided with a conical end portion 37 having a bearing portion 38 of uniform cross section at its large end, and a bearing portion 40 of uniform cross section at its small end (FIGS. 2 and 5). Bearing portions 38 and 40 are respectively rotatably received in the outer end of socket 32 and the cylindrical pilot opening 34. End portion 37 is formed with an annular, external groove 41 which receives a snap ring 42 locked between a flange 44 on drawbar 6 and an annular plate member 43 which is bolted to the drawbar flange. Snap ring 42, plates 43, and flange 44 cooperate to secure the implement tongue against axial movement with respect to the drawbar while at the same time permitting the implement tongue to rotate about its longitudinal axis with respect to the drawbar. Moreover, the lifting forces exerted on the implement tongue by hydraulic cylinders 16 through frame 15 are resisted by the portions 38 and 40 of end portion 37 to transfer this lifting force to the rear wheels of the tractor. Thus, the conical portion 37 provides a cantilever lifting connection between the implement tongue and drawbar.

As shown in FIGS. 2 and 5, the drive shaft 9 of the implement is rotatably supported in a bearing 46 seated in the outer end of conical end portion 37 of the implement tongue. For coupling the drive shaft 9 with the power-take-off shaft 8 of the tractor, the telescopic universal coupling 11 includes a tractor coupling unit 47 and a drawbar coupling unit 48. The tractor coupling unit 47 includes a universal joint 49 having a coupling shaft 50 mounted thereon and projecting rearwardly from the tractor. The tractor coupling shaft 50 is externally splined as shown in FIG. 2.

The drawbar coupling unit includes a universal joint 51 having a coupling shaft 53 which is internally splined for telescopic engagement with the tractor coupling shaft 50. The drawbar universal joint 51 is formed with a rearwardly extending, internally splined spindle 54 which is rotatably supported in a bearing 55 seated in the bearing recess 36. The universal joint 51 is secured against axial displacement with respect to bearing 55 by a conventional snap ring 56. Bearing 55 is secured in place in bearing recess 36 by a set screw 57 mounted in the outer wall of drawbar 6.

Drive shaft 9 is formed with an externally splined end portion 58 which, when end portion 37 of the implement tongue is locked in position in socket 32 of the drawbar, seats in the internally splined spindle 54 to rotatably couple shaft 9 with the lower-take-off shaft 8 of the tractor.

A cylindrical shield 59 having a flared or bell-shaped end 59a is mounted on the rear end of the tractor to enclose the end of the power-take-off shaft 8 and the universal joint 49 of the tractor portion of the coupling 11. Drawbar 6 may be flared or bell-shaped at its forward end as indicated at 26a in FIGS. 2 and 3 such that maximum shielding of the rotating joints and shafts is obtained in all positions of the drawbar by the coacting bellguards 59a and 26a.

In operation, the ground supported implement or trailer may be coupled to the tractor by supporting the implement tongue 7 on the jackstand 4 shown in FIG. 1 and backing the tractor toward the tongue until the conical end portion 37 seats in the recess of the drawbar. As end portion 37 moves into the position shown in FIG. 2, the tapered end portions 58a of the splines of drive shaft 9 engage the chamfered ends of the internal splines of spindle 54 and cam into engagement with the spindle. Snap ring 41, plate 43 and flange 44 cooperate to secure tongue 7 axially to the drawbar, but in the illustrated arrangement, the implement tongue 7 is free to rotate about its longitudinal axis with respect to the drawbar to accommodate rolling movement of the implement with respect to the tractor. Tongue 7 is secured in rigid axial alignment with drawbar 6 and follows the movement of the drawbar upwardly and downwardly and from side to side with respect to the tractor.

No draft forces are imported to the drive train including the PTO shaft 8, universal coupling 11 and implement drive shaft 9. Moreover, the latter parts are shielded at all times and in all positions of the implement with respect to the tractor. The drawbar is capable of swinging about axis Y—Y up to about 70 degrees on either side of the longitudinal axis of the tractor, and vertically up to about 30 degrees above and below the horizontal. Even in the event of separation or breakage of shafts 50 and 53, the rotating pieces would be shielded by the drawbar. A minimum amount of physical effort is required to connect the implement and tractor since the implement tongue and drawbar, together with the drive coupling and implement drive shaft are self-aligning.

In the embodiment illustrated in FIG. 7, the power-take-off shaft 8' of tractor 1' is located above the axis of the drawbar and implement drive shaft. Secured to the rear wall 66 of vehicle 1' is a gear housing 65 for meshed input and output bevel gears 67 and 68, respectively. The shaft of input gear 67 is splined to the PTO shaft 8'.

Drawbar 6' is formed at its forward end with a gear housing 69 for meshed input and output bevel gears 70 and 71, respectively. The gear housing portion 69 of drawbar 6' is rotatably mounted on the collar member 24 for pivotal movement about axis Y—Y as in the embodiment of FIGS. 1–6. The output bevel gear 71 has its shaft internally splined to receive the splined end of the implement drive shaft 9.

Gears 68 and 70 are coupled together by a universal coupling 72 including universal joints 73 and 74 carried by the shafts of gears 68 and 70, respectively, and coupled together by splined, telescoping shafts 75 and 76 secured to the universal joints 73 and 74, respectively.

Gear housings 65 and 70 are formed with hollow hemispherical portions 77 and 80, respectively, on which are mounted the complementary hemispherical ends of telescoping sleeves 78 and 79, respectively, which enclose and shield the rotating joints and telescoping shafts of the universal coupling 72. Sleeves 78 and 79 are movable with respect to the gear housings and each other to shield the universal coupling 72 during pivotal movement of the drawbar 6' about axis X—X.

It will be apparent to those skilled in the art that the invention is not limited to the specific arrangements shown and described, but that other forms may be adopted without departing from the scope and spirit of the invention as defined by the appended claims.

I claim:

1. A tractor-trailer combination including a combined draft and power coupling between the tractor and trailer comprising a power-take-off shaft on the tractor, a drawbar mounted on the tractor for vertical pivotal movement about a transverse, horizontal axis and for lateral swinging movement about an axis normal to and rotatable about said horizontal axis, a tongue projecting forwardly from the trailer and connected coaxially with said drawbar for transmitting draft loads between said tractor and trailer through said drawbar and tongue, an extensible and retractable universal coupling between said power-take-off shaft and drawbar, said universal coupling including an output universal joint fixed to said power-take-off shaft, an input universal joint rotatably mounted in said drawbar, input and output stub shafts mounted respectively on said input and output universal joints and non-rotatably and telescopically connected together for transmitting rotation between said input and output universal joints, a longitudinal socket in said drawbar, said tongue being received in said socket, an elongate opening in said tongue coaxial with said socket, said tongue being mounted in said socket for rotation about its longitudinal axis with respect to said drawbar for accommodating tilting of the trailer with respect to the tractor, and a drive shaft on the trailer extending through said opening and socket into non-rotatable engagement with said output universal joint such that the drive shaft is enclosed by and parallel to said drawbar and tongue in all positions of said drawbar and tongue with respect to the tractor, an arcuate frame member mounted on the rear of the tractor for vertical pivotal movement about the horizontal pivotal axis of the drawbar, and follower means connecting the drawbar with said arcuate frame such that the arcuate frame and drawbar move as a unit about the horizontal axis and the follower moves about the arcuate frame during horizontal swinging movement of the drawbar.

2. An implement-tractor combination comprising a hitch mechanism including a drawbar pivoted on the tractor for lateral swinging movement and having a rearwardly facing conical socket, a power lift mechanism on the tractor for raising and lowering the drawbar relative to the tractor, a tongue on said implement having a conically formed end seated snugly within said socket so as to hold the tongue in rigid longitudinal alignment with the drawbar and to define a cantilever lifting connection between the tongue and drawbar, means defining a pulling connection locking said end against withdrawal from said socket while permitting relative rotation between the tongue and the drawbar, and a power train extending through said hollow drawbar and tongue for transmitting power from the tractor to the implement.

3. A coupling for transferring both a pulling load and a lifting load from a tractor to an implement coupled thereto and for transmitting power from the tractor to the implement, said coupling comprising, a vertically movable hitch mechanism mounted on the tractor, means for raising and lowering said hitch mechanism, a hollow drawbar carried by said hitch mechanism for laterally swinging movement, an elongated hollow tongue member adapted to be rigidly secured at one end to the implement, said drawbar having a hollow conical socket, said tongue having a hollow portion at the other end formed with axially spaced cylindrical portions joined by an intermediate portion, said drawbar socket having internal axially spaced cylindrical portions corresponding in location and diameter to the tongue cylindrical portions and joined by an intermediate portion, said axially spaced cylindrical portions of said tongue and socket coacting with one another to define a cantilever connection for transmitting lifting loads between said members while permitting relative rotation therebetween, said socket member intermediate portion having a larger diameter at any point throughout its length than the diameter of corresponding points throughout the length of the end portion on said tongue member, means for releasably locking said tongue member cylindrical portions in said socket member cylindrical portions so as to permit pulling loads between said members while also permitting relative rotation between said members, and a power train extending from the tractor through said socket and hollow tongue for transmitting power from the tractor to the implement.

4. The construction of claim 1 further including power-operated lift means for selectively actuating said arcuate frame about said transverse pivotal axis.

5. The construction of claim 4 in which said arcuate frame member includes forwardly projecting arms pivoted to the rear of the tractor on said horizontal axis, and further including a cross piece extending between said arms along said horizontal pivotal axis, said drawbar being pivotally mounted on said cross piece for said lateral swinging movement about said normal axis.

6. A combined draft and power coupling for connecting an implement having a drive shaft with a tractor having a rearwardly projecting power-take-off shaft for simultaneously towing said implement and transmitting power to said drive shaft through said power-take-off shaft including an arcuate frame having forwardly projecting arms mounted on the rear of the tractor for pivotal movement about a transverse horizontal axis, a rearwardly projecting drawbar mounted on the rear of the tractor for vertical pivotal movement about said horizontal transverse axis and for horizontal swinging movement about a vertical axis perpendicular to and rotatable about said horizontal transverse axis, follower means on said drawbar engaged with said arcuate frame for causing the drawbar and frame to move as a unit about said horizontal transverse axis, a recess formed in said drawbar, a tongue projecting forwardly from said implement with its end received in said recess and secured in axial relationship to said drawbar, a longitudinal recess in said tongue in coaxial relationship with the recess in said drawbar, said implement drive shaft extending through said coaxial recesses, and coupling means connecting said power-take-off shaft with said implement drive shaft for transmitting power to said drive shaft in all positions of said drawbar and implement tongue with respect to the tractor.

References Cited

UNITED STATES PATENTS

| | | | |
|---|---|---|---|
| 1,706,742 | 3/1929 | Raimer et al. | 180—14 |
| 1,935,811 | 11/1933 | Metcalf | 180—14 X |
| 2,622,890 | 12/1952 | Moses | 180—14 X |
| 3,007,535 | 11/1961 | Lippke | 180—14 |
| 3,074,501 | 1/1963 | Lane et al. | 180—14 |
| 3,241,862 | 3/1966 | Bunting | 280—490 |

FOREIGN PATENTS

| | | |
|---|---|---|
| 183,260 | 2/1955 | Austria. |
| 771,517 | 4/1957 | Great Britain. |

LEO FRIAGLIA, *Primary Examiner.*

BENJAMIN HERSH, *Examiner.*

C. C. PARSONS, *Assistant Examiner.*